(12) United States Patent
Bullard et al.

(10) Patent No.: US 11,015,669 B2
(45) Date of Patent: May 25, 2021

(54) BI-DIRECTIONAL NON-LINEAR SPRING

(71) Applicant: Raytheon Company, Waltham, MA (US)

(72) Inventors: Andrew L. Bullard, Manhattan Beach, CA (US); Shane E. Wilson, Torrance, CA (US); Ricardo A. Aguilera, Alhambra, CA (US); Ryan Yates, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 16/460,816

(22) Filed: Jul. 2, 2019

(65) Prior Publication Data

US 2019/0323572 A1 Oct. 24, 2019

Related U.S. Application Data

(62) Division of application No. 15/344,434, filed on Nov. 4, 2016, now Pat. No. 10,337,577.

(51) Int. Cl.
| | | |
|---|---|---|
| *F16F 1/22* | (2006.01) | |
| *F16F 1/02* | (2006.01) | |
| *F16F 1/18* | (2006.01) | |
| *F16F 3/02* | (2006.01) | |
| *F16M 11/24* | (2006.01) | |

(52) U.S. Cl.
CPC ............... *F16F 1/22* (2013.01); *F16F 1/025* (2013.01); *F16F 1/18* (2013.01); *F16F 3/02* (2013.01); *F16F 2228/066* (2013.01); *F16F 2238/022* (2013.01); *F16M 11/24* (2013.01)

(58) Field of Classification Search
CPC ........ F16F 1/22; F16F 1/32; F16F 3/02; F16F 9/04; F16F 9/103; F16F 13/06; F16F 15/0237; F16F 2228/066; F16F 2238/022; F16M 11/24
See application file for complete search history.

(56) References Cited

U.S. PATENT DOCUMENTS

| | | | |
|---|---|---|---|
| 1,826,597 A | 10/1931 | Brecht | |
| 2,162,719 A * | 6/1939 | Hay | .......... F16F 1/32 |
| | | | 267/162 |

(Continued)

FOREIGN PATENT DOCUMENTS

| | | |
|---|---|---|
| CN | 103587724 A | 2/2014 |
| CN | 103587724 B | 4/2016 |

(Continued)

OTHER PUBLICATIONS

International Search Report for International Application No. PCT/US2017/049917 dated Dec. 15, 2017, 16 pages.

*Primary Examiner* — Thomas W Irvin

(57) ABSTRACT

A linear spring member having an annular region with a first thickness connected in series by cylindrical regions having a second thickness, wherein the first thickness is less than the second thickness. Outer portions of adjacent annular regions are coupled together by a first cylindrical region and inner portions of adjacent annular regions are coupled together by a second cylindrical region such that the effective spring rate of the bi-directional spring device increases symmetrically as it is displaced in either compression or tension.

10 Claims, 14 Drawing Sheets

(56) References Cited

U.S. PATENT DOCUMENTS

| | | | |
|---|---|---|---|
| 3,394,631 A * | 7/1968 | Thompson | F16F 3/02 |
| | | | 92/46 |
| 3,727,900 A | 4/1973 | Casey | |
| 3,815,887 A | 6/1974 | Curtis et al. | |
| 4,765,600 A | 8/1988 | Hartel | |
| 4,773,632 A | 9/1988 | Hartel | |
| 4,792,708 A | 12/1988 | Boyer | |
| 5,205,652 A | 4/1993 | Chapman | |
| 5,222,718 A | 6/1993 | Buck | |
| 5,788,262 A | 8/1998 | Dazy et al. | |
| 5,971,375 A | 10/1999 | Simonian et al. | |
| 8,402,951 B2 | 3/2013 | Bluen | |
| 9,777,793 B1 | 10/2017 | Chen et al. | |
| 9,845,851 B2 | 12/2017 | Orita | |
| 10,041,622 B2 | 8/2018 | Bullard et al. | |
| 2008/0269741 A1 | 10/2008 | Karidis | |
| 2010/0038995 A1 | 2/2010 | Claeyssen et al. | |
| 2011/0156327 A1 * | 6/2011 | Nobusue | F16F 1/373 |
| | | | 267/153 |
| 2012/0056363 A1 | 3/2012 | Ritter et al. | |
| 2012/0292476 A1 | 11/2012 | Smith et al. | |
| 2013/0114152 A1 * | 5/2013 | Watson | F16F 15/0237 |
| | | | 359/819 |
| 2013/0154170 A1 | 6/2013 | Davis et al. | |
| 2014/0008557 A1 | 1/2014 | Vandamme | |
| 2014/0284859 A1 * | 9/2014 | Nobusue | B60G 15/062 |
| | | | 267/292 |
| 2014/0312543 A1 | 10/2014 | Nakagawa et al. | |
| 2016/0140862 A1 | 5/2016 | Van Lookeren Campagne et al. | |
| 2016/0257177 A1 * | 9/2016 | Nobusue | F16F 9/58 |
| 2018/0031068 A1 * | 2/2018 | Szekely | F16F 9/58 |
| 2018/0128418 A1 | 5/2018 | Bullard et al. | |

FOREIGN PATENT DOCUMENTS

| | | |
|---|---|---|
| DE | 14286 A1 | 1/1958 |
| DE | 10303706 A1 | 4/2005 |
| EP | 0343774 B1 | 8/1992 |
| JP | 85244 C | 11/1929 |
| JP | S50-85751 A | 7/1975 |
| JP | S62-113936 A | 5/1987 |
| JP | 10-159898 A | 6/1998 |
| JP | 2006029137 A | 2/2006 |
| JP | 2006-300263 A | 11/2006 |
| JP | 2008-089114 A | 4/2008 |
| JP | 2013137102 A | 7/2013 |
| JP | 2016-169830 A | 9/2016 |
| JP | 2016226259 A | 12/2016 |
| WO | WO 2011018476 A2 | 2/2011 |

* cited by examiner

BI-DIRECTIONAL NON-LINEAR SPRING

RELATED APPLICATIONS

This is a divisional application of U.S. application Ser. No. 15/344,434, filed Nov. 4, 2016, entitled "Bi-Directional Non-Linear Spring" which is incorporated by reference in its entirety herein.

GOVERNMENT LICENSE RIGHTS

This invention was made with government support. The government has certain rights in the invention.

BACKGROUND

Sensors, including optical or electrical sensors, used in vehicles can be sensitive to vibration which can degrade performance. A suspension system, such as a conventional coil spring, can be used to support a sensor in an attempt to minimize transmitted vibration. However, such systems can result in large displacements of the sensor during an event of high acceleration or high deceleration. Likewise, devices may generate vibrational forces, including high-amplitude vibration, which need to be isolated from sensitive instrumentation. Conventionally, when sensors have been carried by rocket systems, for example, launch locks or bumpers have been used to minimize sensor displacement during a launch or landing event. However, launch locks are complicated and expensive and bumpers can result in high impacts to the sensor during an extremely high acceleration or deceleration event. Other systems that result in smaller displacements are "stiff" systems that do not adequately attenuate vibration during operation. In other systems, vibrations are attenuated using arrangements that are "stiff" while in tension and "soft" while under compression. It is therefore desirable to have a device that can act as a bi-directional spring with non-linear spring rates that provide for limited displacement in multiple degrees of freedom during high amplitude vibrational events while attenuating low level vibration during low vibrational events.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
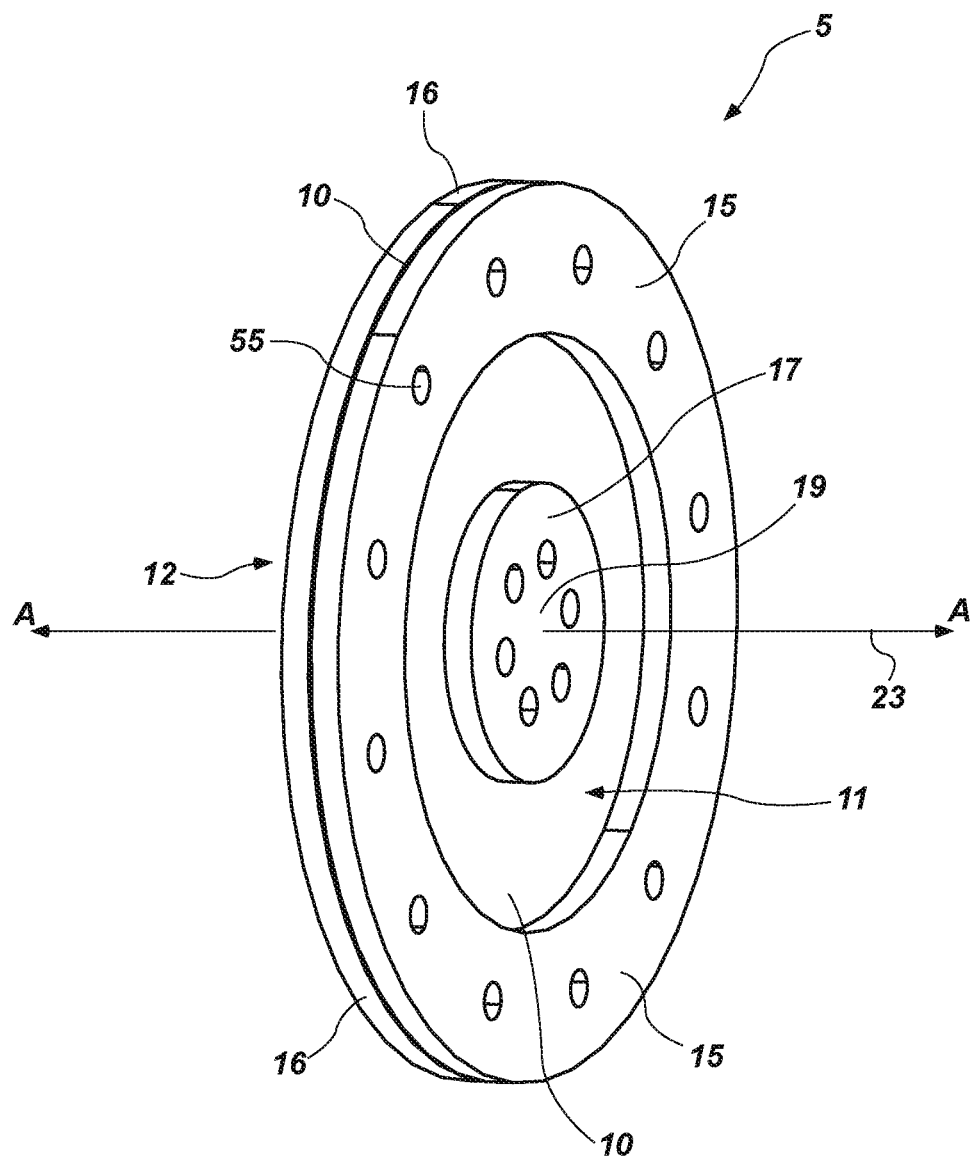
FIG. 1 is a perspective view of a bi-directional spring in accordance with an example of the present disclosure.

Reference will now be made to the exemplary embodiments illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

In accordance with an example of the present disclosure, a suspension system having a plurality of struts mounted to a support platform is disclosed. The suspension system is coupled to a payload. Each strut comprises a spring strut having a non-linear spring component and a linear spring component. The linear spring has a "linear" or constant spring rate. The non-linear spring rate changes as the spring is displaced. The struts are configured to constrain multiple (e.g., at least two and up to six) degrees of freedom (i.e., independent directions of motion) of the payload such that the fundamental resonant modes of the suspension are at closely spaced frequencies. The non-linear spring rates of the struts are low when not exposed to large forces and therefore provide substantial attenuation of any low-amplitude transmitted vibrational forces. The non-linear spring rates of the struts increase as longitudinal forces acting on the struts increase which limits displacement of the supported payload when exposed to high amplitude vibrational forces acting on the support platform. In one aspect, the non-linear spring has a spring rate that increases symmetrically in compression or tension as a function of displacement. The linear spring can be coupled in series with the non-linear spring and a longitudinal axis of the linear spring is aligned to be coaxial with a longitudinal axis of the nonlinear spring. There are multiple possible combinations of linear and nonlinear springs which can be used to assemble the suspension system and achieve the same result. Exemplary springs are disclosed herein.

In one embodiment, the bi-directional spring comprises a compliant member, such as a planar circular or a rectangular compliant member. A rigid annular member is disclosed having a uniform thickness and enclosing an outer portion of the compliant member. The compliant member can be disposed within the rigid annular member, wherein the center of the compliant member and the center of the first rigid annular member are collinear. The compliant member can comprise a thickness less than the thickness of the rigid annular member. In one aspect, the compliant member can be circular. A pair of opposing center constraint members can be disposed on either side of the compliant member and these can be concentric with the compliant member and the rigid annular member. In one aspect, this bi-directional spring can be described as a diaphragm spring. A plurality of such diaphragm springs can be coupled together.

In one embodiment, a system is disclosed that can comprise a bi-directional spring member having a variable spring rate mounted to a vehicle and carrying a sensor thereon. The bi-directional spring member can comprise a rigid annular member enclosing a portion of a compliant member, wherein the thickness of the compliant member can be less than the thickness of the rigid annular member. A center portion of the rigid annular member and a center portion of the compliant member can be collinear, wherein an imaginary axis passing through the center portions of the compliant member and the center of the rigid annular member can be substantially perpendicular to a face of the compliant member and a face of the rigid annular member. Flexure of the compliant member can accommodate movement of the sensor during vibrational events from operation of the vehicle or operation of a device associated with the vehicle. Of course other-shaped compliant members are contemplated herein. A linear spring member is coupled to the non-linear bi-directional spring to create an improved spring device capable of attenuating both low and high amplitude vibrations.

A method of minimizing vibrational forces using the system can comprise using a vehicle having a bi-directional spring member disposed on the vehicle, the spring member carrying a sensor disposed in a center of the spring member. The bi-directional spring member can comprise a rigid annular member having a first thickness and a compliant member disposed in part within the rigid annular member having a second thickness, wherein the second thickness can be less than the first thickness, and wherein an imaginary axis passing through the center of the compliant member and the center of the rigid annular member can be substantially perpendicular to a face of the compliant member and a face of the rigid annular member. The method can further comprise creating a load on the bi-directional spring by moving the vehicle or operating a device onboard the vehicle, causing a force to act on the bi-directional spring in a direction that is parallel with the imaginary axis passing through the center of the compliant circular planar member and in a direction away from a position of the sensor. It is understood that the technology is primarily useful when used in connection with a system of spring linkages and/or a non-linear spring.

In one aspect, the bi-directional nonlinear spring comprises at least two compliant members having a first thickness coupled to connecting rigid annular members having a second thickness. The first thickness is less than the second thickness and the rigid annular members alternatingly connect either the outer diameter of a compliant member to the outer diameter of an adjacent compliant member or the inner diameter of a compliant member to the inner diameter of an adjacent compliant member such that they are structurally connected in series. The effective spring rate of the nonlinear spring increases symmetrically as it is displaced in either compression or tension.

It is to be understood that the example inventive concepts and technology discussed herein is/are not limited to the particular structures, process steps, or materials disclosed herein, but are extended to equivalents thereof as would be recognized by those ordinarily skilled in the arts. It should also be understood that terminology employed herein is used for the purpose of describing particular inventive concepts only and is not intended to be limiting.

Reference throughout this specification to "one example" or "an example" means that a particular feature, structure, or characteristic described in connection with the example is included in at least one example of the present invention. Thus, appearances of the phrases "in one example" or "in an example" in various places throughout this specification are not necessarily all referring to the same example.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Figure 2:
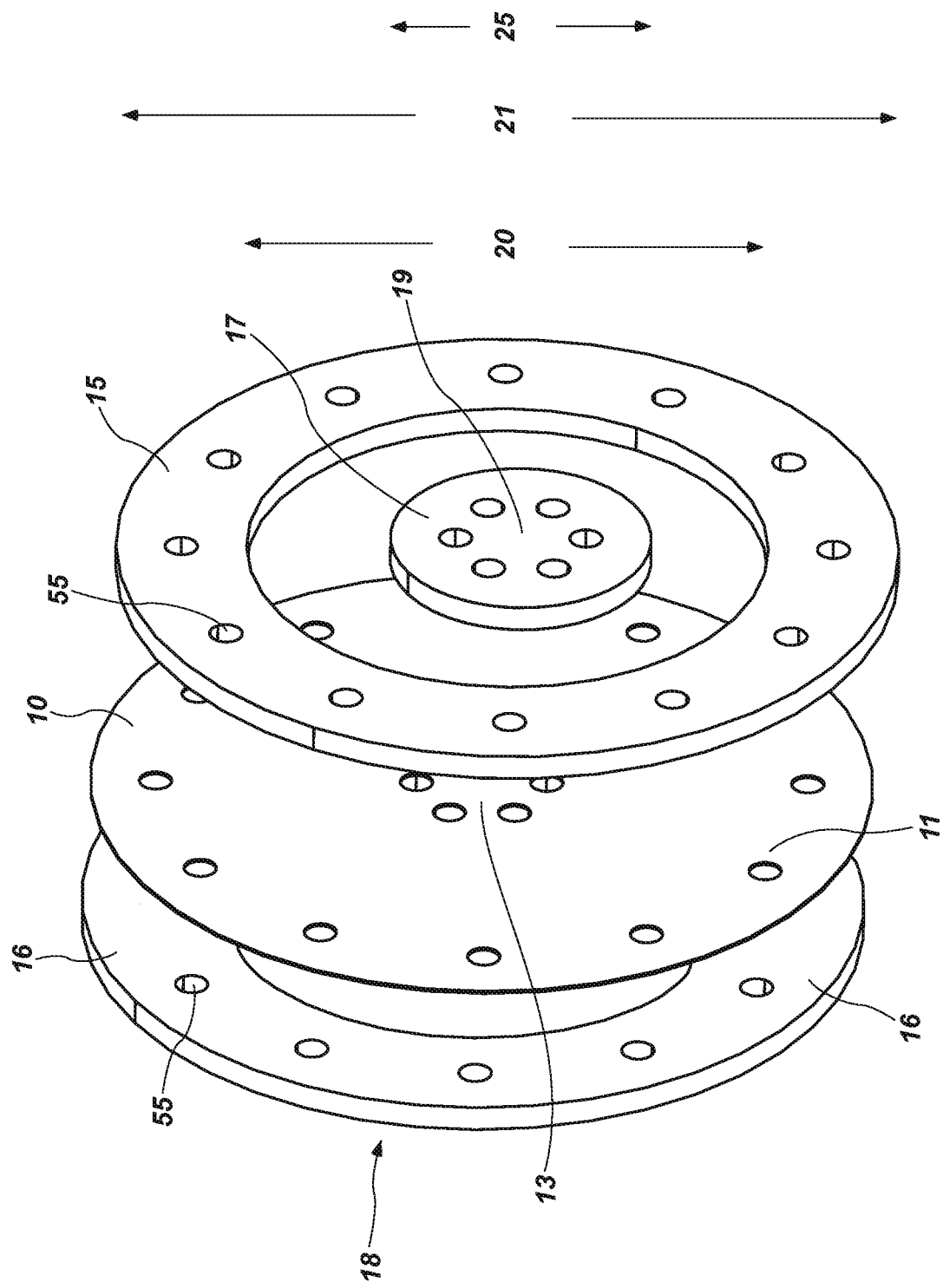
FIG. 2 is an exploded perspective view of the bi-directional spring of FIG. 1.
Figure 3:
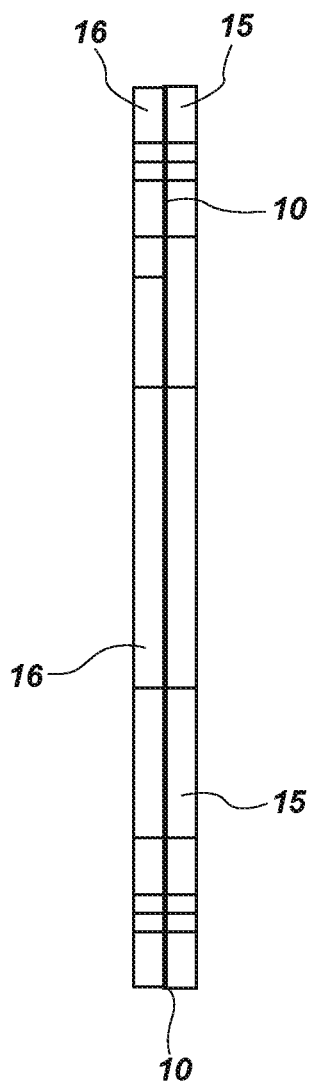
FIG. 3 is a side view of the bi-directional spring of FIG. 1.

With reference now to FIGS. 1-3, a bi-directional spring device 5 is disclosed comprising a compliant member 10 having a uniform thickness across the compliant member 10. A first rigid annular member 15 having a uniform thickness can be disposed on a first side 11 of the compliant member 10. A second rigid annular member 16 having a uniform thickness can be disposed on a second side 12 of the compliant member 10. The thickness of the first rigid annular member 15 and the second rigid annular member 16 can be substantially equivalent. In accordance with one example, the first rigid annular member 15 and the second rigid annular member 16 can have an inner diameter 20 and an outer diameter 21. The inner diameter 20 of the first rigid annular member 15 can be substantially equivalent to the inner diameter 20 of the second rigid annular member 16, Likewise, the outer diameter 21 of the first rigid annular member 15 can be substantially equivalent to the outer diameter 21 of the second annular planar member 16. Advantageously, the bi-directional non-linear spring member 5 disclosed can provide low stiffness for low excitations (i.e., small variations in movement of the vehicle, etc.), which can function to isolate high frequency noise. It also can provide high stiffness for large excitations, which limits displacement of an accompanied device subjected to vibration, such as vehicle launch loads and/or landing loads. Reference is made herein to first and second rigid annular members 15, 16 that enclose a portion of a compliant member 10. It is understood that the first and second rigid annular members 15, 16 can be separated by the compliant member 10 or they may form two sides of a unitary rigid annular member that encloses a portion of the compliant member 10.

In accordance with one example, the ci-directional spring device 5 can be secured to a vehicle by coupling at least a portion of the first and second rigid annular members 15, 16 to a portion of the vehicle, leaving the compliant member 10 unencumbered and free to move. A sensor, or other device, can be placed/secured on the center portion 13 of the compliant member 10. When the vehicle moves in a direction "A" that is perpendicular to a face of the compliant member 10 or movement of the vehicle or operation of components of the vehicle induce movement of the rigid annular members 15, 16, the compliant member 10 will flex in a direction opposite the direction of travel of the vehicle or opposite the direction of the movement induced on the rigid annular members 15, 16. The flexing action absorbs and/or damps vibrational forces (or other forces) acting on the sensor (or other device) disposed about the center portion 13 of compliant member 10 or otherwise supported by the compliant member 10. The compliant member 10 will resist flexure as a function of the thickness of the compliant member 10, the applied force, and the overall surface area of the compliant member 10 that is not disposed within the first and second rigid annular members 15, 16.

In accordance with one aspect, the compliant member 10 can be disposed between the first rigid annular member 15 and the second rigid annular member 16, wherein the center 13 of the compliant member 10, the first rigid annular member 15, and the second rigid annular member 16 are collinear. An imaginary axis A through the center portion 13 of the compliant member 10, the first rigid annular member 15, and the second rigid annular member 16 is perpendicular to the face of the compliant member 10. While specific reference is made to rigid annular members, it is understood that the outer perimeter of the annular members 15, 16, may be oval, or other-shaped so long as the inner perimeter is circular in order to evenly distribute bending stresses on the compliant member 10. Likewise, the compliant member 10 need not be entirely circular, so long as the compliant member 10 that is subjected to bending stresses is circular in order to evenly distribute those bending stresses about the device.

In one aspect, the compliant member 10 can comprise a thickness less than the thickness of the first and second rigid annular members 15, 16. The relative thicknesses of the compliant member 10 can depend on the relative resistance to movement that is desired and the relative level of vibration to be absorbed. In one non-limiting example, the compliant member 10 can comprise a titanium sheet ranging from between 0.10 and 0.30 mm, and the rigid annular members 15, 16 can comprise a titanium material ranging from between 2 and 6 mm in thickness. In an additional aspect, the inner diameter 20 of the rigid annular members 15, 16 can range from between 25 and 35 mm and an outer diameter 21 of the rigid annular members 15, 16 can range from between 35 and 45 mm. In another aspect, the inner diameter 20 of the rigid annular members 15, 16 can range from between 35 and 45 mm and an outer diameter 21 of the rigid annular members 15, 16 can range from between 45 and 55 mm. However, it is understood that there are numerous variations to the above-referenced dimensions that can be utilized as suits a particular application. In addition, while the use of titanium is specifically referenced in the non-limiting example provided above, it is understood that any number of materials can be used in connection with the invention. Other non-limiting examples include the use of steel, nickel, and/or metal alloys. In some aspects, non-metals may be used. For example, in another non-limiting example, the compliant member 10 can comprise a thermoplastic elastomer, graphite composite, textile, or other compliant synthetic or organic material. The rigid annular members 15, 16 can comprise a thermo-plastic elastomer or rigid polyethylene or other polymeric material as suits a particular application. In addition, while the titanium example above describes the compliant member 10 and the rigid annular members 15, 16 as being made of the same material, it is understood that the compliant member 10 and the rigid annular members 15, 16 can be made of different materials. That is, the dimensions and materials used for the respective members can be varied to "tune" the spring to a specific stiffness, displacement, or strength requirement.

In one aspect of the invention, first and second center constraint members 17, 18 can be disposed on opposing sides of the compliant member 10. The first and second center constraint members 17, 18 can comprise circular disks having a center or center portion 19 that is collinear with the center 13 of the compliant member 10 and the first and second rigid annular members 15, 16. The first and second center constraint members 17, 18 can have a thickness that is substantially equivalent to the thickness of the first and second rigid annular members 15, 16. In an additional aspect, a face of the first center constraint member 17 can be coplanar with a face of the first rigid annular member 15 and a face of the second center constraint member 18 can be coplanar with a face of the second rigid annular member 16. An outer diameter 25 of the first and second center constraint members 17, 18 can be less than an inner diameter 20 of the first and second annular members 15, 16. In one non-limiting example, the outer diameter 25 of the first and second center constraint members 17, 18 can be less than half the inner diameter 20 of the first and second rigid annular members 15, 16, though the dimensions of the center constraint members 17, 18 will vary based on specific design criteria for a specific application. For example, in a situation where more flexure of the compliant member 10 is desired, the difference between the outer diameter 25 of the center constraint members 17, 18 and the inner diameter 20 of the rigid annular members 15, 16 will be greater than where less flexure of the compliant member 10 is desired. In one example, the center constraint members 17, 18 can comprise a material that is equivalent to the material used to manufacture the rigid annular planar members 15, 16, however, the two can be made from different materials, as suits a particular application.

Figure 4:
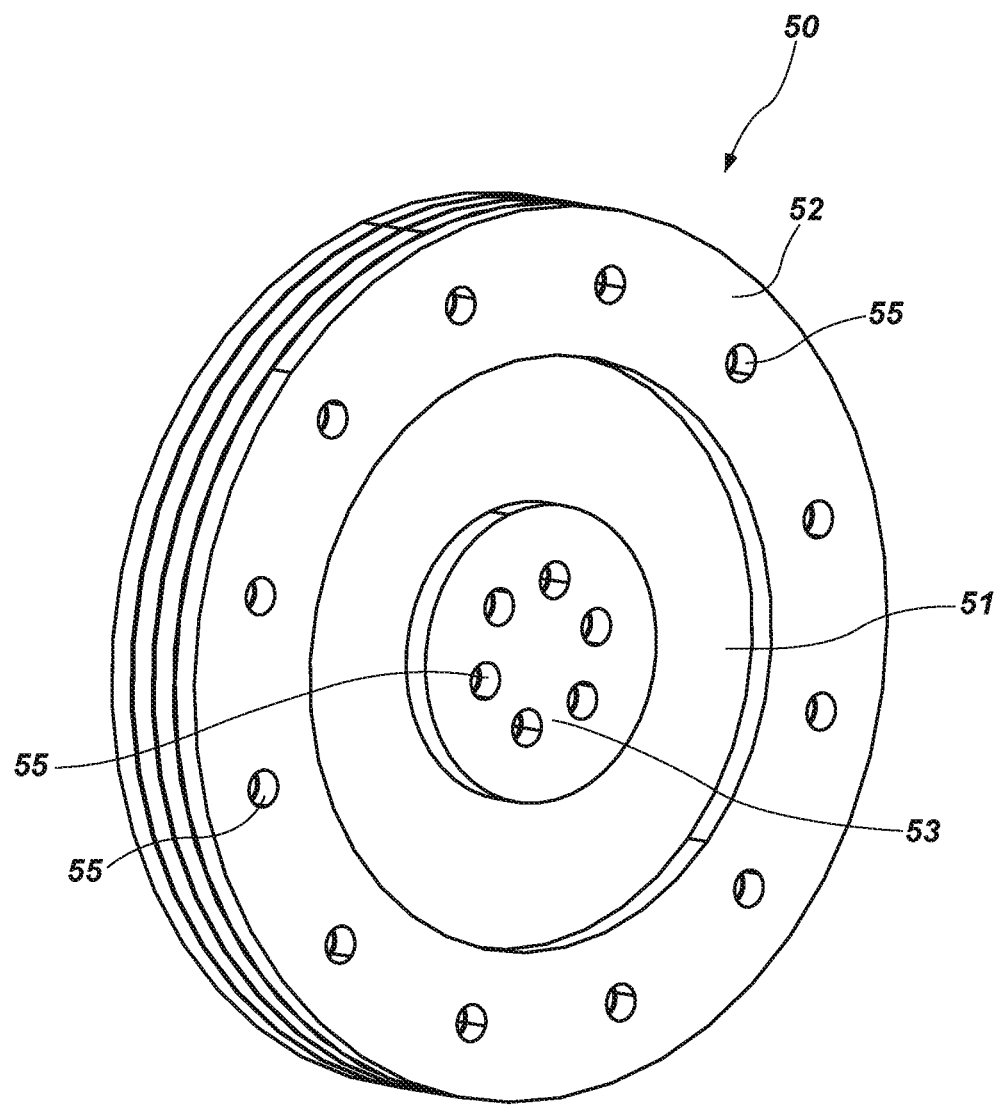
FIG. 4 is a side view of a bi-directional spring in accordance with an example of the present disclosure.
Figure 5:
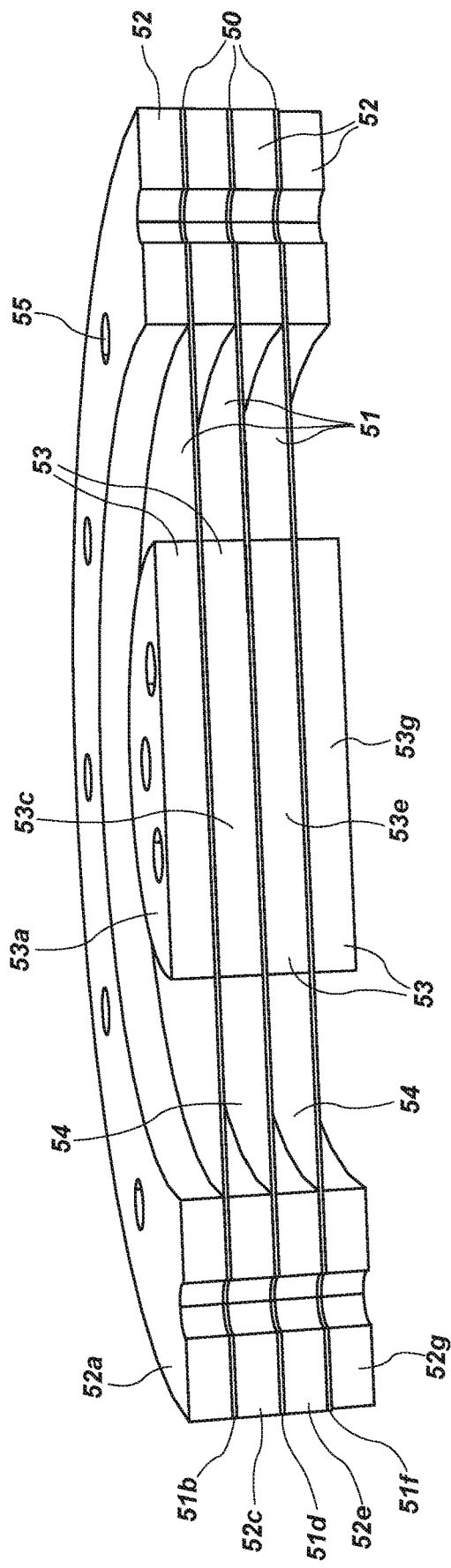
FIG. 5 is a perspective cross-sectional view of the bi-directional spring of FIG. 4.

Referring generally to FIGS. 1-3 where like numerals may describe similar features, but as shown in greater detail in FIGS. 4-5, a bi-directional spring device 50 is disclosed that can comprise a plurality of compliant members 51, a plurality of rigid annular members 52, and a plurality of center constraint members 53 coupled together at adjacent points along the face of adjacent rigid annular members 52 and adjacent center constraint members 53. In one aspect, the spring device 50 can comprise a first layer comprising a rigid annular member 52a and a center constraint member 53a. A compliant member 51b can comprise the second layer. The third layer can be similar to the first layer having a rigid annular member 52c and center constraint member 53c. The first and third layers can enclose portions of the compliant member 51b or second layer. A fourth layer can comprise another compliant member 51d disposed behind the third layer followed by a fifth layer (52e, 53e) similar to the first and third layers. A sixth layer can comprise yet another compliant member 51f, and a seventh layer yet another rigid annular member 52g/center constraint member 53g combination. The resulting combination of layers is a bi-directional spring device 50 with a plurality of coupled concentric diaphragm (or sheet) spring members that are operatively coupled to distribute forces about the different diaphragms.

The differences between the relative thicknesses of the compliant member 51 and the rigid annular member 52/center constraint member 53 combination creates a space 54 between the different compliant members 51, such that they are not in contact with one another. Rather, adjacent rigid annular member 52/center constraint member 53 combinations can be coupled together and the relative forces acting on the combined bi-directional spring device 50 can be transferred through that coupling contact. That is, force that is applied to a top center constraint member 53a, for example, can be transferred through adjacent and collinear constraint members (53c, 53e, 53g). Because they are coupled to their attendant compliant members, the force transferred through the center constraint members is resisted by the attendant compliant member coupled to the center constraint members.

In one aspect of the invention, adjacent rigid annular member/center constraint member combinations can be coupled by welding, fusing, adhesion or some other permanent means of fixation. In another aspect, however, the combinations can be bolted or screwed together to permit assembly/disassembly of a bi-directional spring member combination using a different numbers of layers. For example, a user may wish to have a spring device with two concentric compliant members or ten concentric compliant members coupled together by the rigid annular/center constraint member combination. In one aspect, a plurality of apertures 55 can be disposed through the rigid annular planar member 52/center constraint member 53 combinations and the compliant members 51 to enable a user to couple adjacent layers together through bolting or other suitable means.

Figure 6:
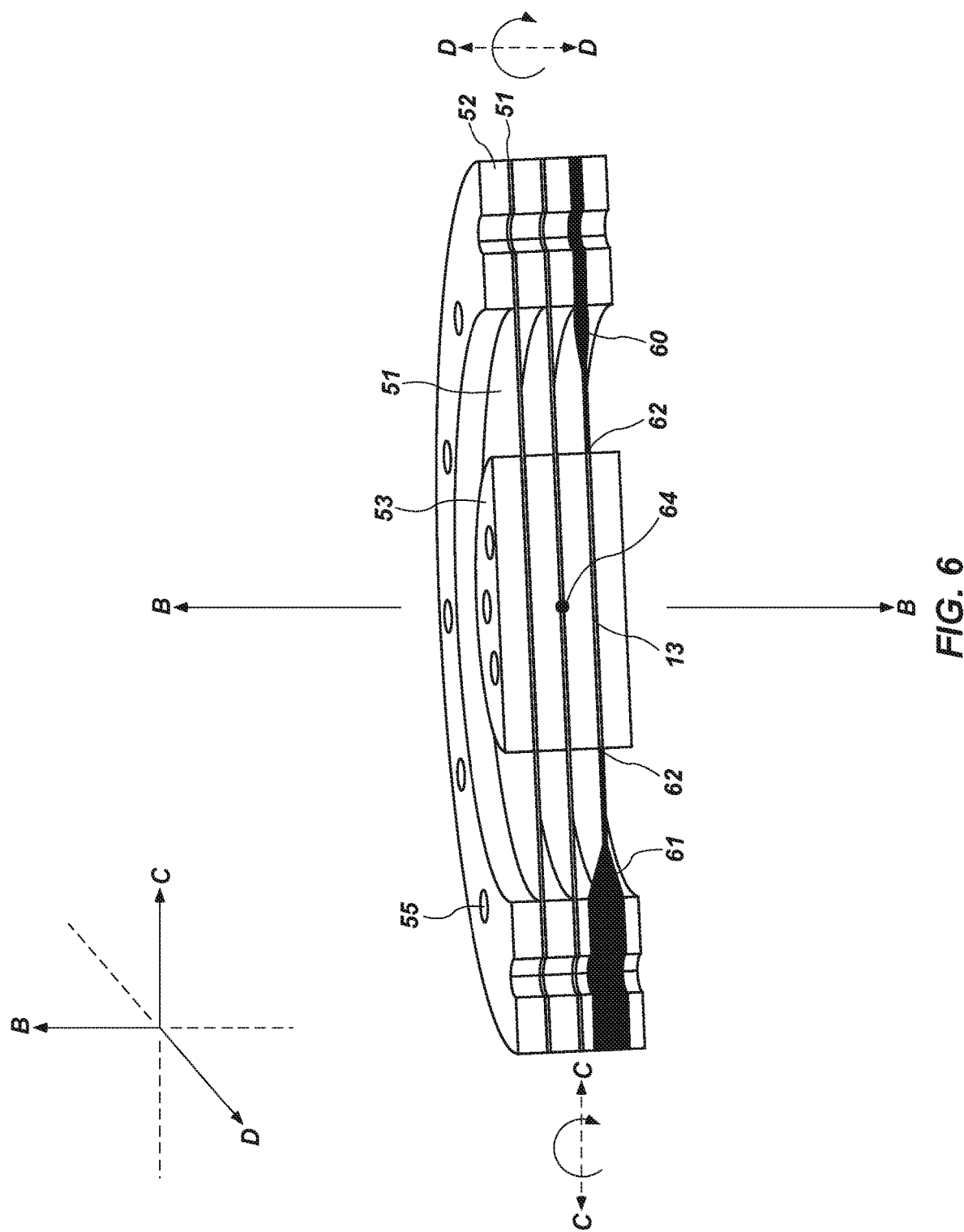
FIG. 6 is a perspective cross-sectional view of a bi-directional spring in accordance with one or more examples of the present disclosure.

With reference generally to FIGS. 1-5, but as shown in greater detail in FIG. 6, in one aspect, the thickness of the compliant member 51 can decrease generally in a direction from the center portion 13 of the compliant member 51 and extending outward away from the center portion 13 of the compliant member 51. In aspects of the technology, it will be more beneficial for a variable thickness of the compliant member 51 to be greater near the center portion 13 where stresses on the spring will be higher. The thickness of the compliant member 51 can increase at a linear rate 60 or a non-linear rate 61 depending on a particular application. In addition, the starting point of the linear 60 or non-linear 61 variation of the thickness of the compliant member 51 may be near the center portion 13 of the compliant member 51. However, in one aspect, the beginning point can be near the mid-point 62 of the diameter of the compliant member 51 or at some other point along the diameter of the compliant member 51 as suits a particular application. In another aspect, the thickness of the compliant member 51 can decrease generally from the center portion 13 of the compliant member 51 extending outward away from the center portion 13 of the compliant member 51. As with the increase in thickness, the decrease in the thickness may be at a linear 60 or non-linear 61 rate as suits a particular application.

Further disclosed is a system for minimizing sensor vibration incorporating a bi-directional spring. The bi-directional spring device 50 can be mounted to a vehicle and can comprise a rigid annular member 52 having a first thickness and a compliant member 51 disposed within the rigid annular member 52 having a second thickness. The thickness of the compliant member 51 can be less than the thickness of the rigid annular member 52, which contributes to the compliant behavior of the device. A center of the rigid annular member 52 and a center 13 of the compliant member 51 can be collinear, wherein an imaginary axis B passing through the center 13 of the compliant member 51 and the center of the rigid annular member 52 is substantially perpendicular to a face of the compliant member 51 and a face of the rigid annular member 52. A sensor can be disposed about the center portion 13 of the compliant member 51 or atop a center constraint member 53. In one aspect, a longitudinal axis B of the bi-directional spring device 50 can be parallel with a direction of travel of the vehicle or parallel with a force acting on the bi-directional spring 50 resulting from travel of the vehicle or resulting from vibrational forces (such as operation of a motor, for example) acting on the bi-directional spring device 50. In another aspect, a longitudinal axis B of the bi-directional spring device 50 can be perpendicular with a direction of travel of the vehicle or forces resulting from travel of the vehicle, operation of a device onboard the vehicle, or other forces acting on the vehicle. The bi-directional spring member 50 can comprise two center constraint members 53 disposed on opposing sides of the compliant member 51. The thickness of the combined center constraint members 53 can be substantially equivalent to the thickness of the rigid annular member 52 enclosing a portion of compliant member 51, and a face of the rigid annular member 52 can be coplanar with a face of the center constraint member 53.

In accordance with one aspect of the invention, the bi-directional spring device 50 can have a first position, wherein when the bi-directional spring device 50 is in an unbiased position, the rigid annular member 52 and center constraint member 53 are coplanar. When subjected to a load, the center constraint member 53 can move in a direction perpendicular to a face of the rigid annular member 52 as the compliant member 51 flexes, placing the bi-directional spring device 50 in a second position, wherein the center constraint member 53 is no longer coplanar with the rigid annular member 52. The spring 50 can have a third position where the center constraint member 53 moves to an opposite side of the rigid annular member 52 as a result of flexure of the compliant member 51 in a direction opposite the first direction. Similar to the second position, the third position can also result in an arrangement where the center constraint member 53 is not coplanar with the rigid annular member 52. The resulting configuration provides for spring flexure in at least two directions having a variable (or non-linear) spring rate.

The system described herein and attendant bi-directional spring devices are usable in connection with a method for minimizing vibrational forces acting on sensors, or other devices used in connection with the spring. In one aspect, the method can comprise using a vehicle having a bi-directional spring device 50 disposed on the vehicle. The bi-directional spring device 50 can carry a sensor disposed about a center of the bi-directional spring device 50 or can be coupled to a platform for carrying the sensor. The bi-directional spring device 50 can comprise a rigid annular member 52 and a compliant member 51 disposed within the rigid annular member 52, wherein the thickness of the compliant member 51 is less than the thickness of the rigid annular member 52. An imaginary axis B passes through the center of the rigid annular member 52 and compliant member 51. Movement of the vehicle (e.g., through rapid acceleration, rapid deceleration, or rapid changes in direction), or operation of a device on board the vehicle can create a load on the bi-directional spring device 50. This may be generated by moving the vehicle in a direction that is parallel with the imaginary axis B passing through the center portion 13 of the compliant member 51 and/or inducing vibrational forces acting on the bi-directional spring device 50 in that direction. In one aspect, the direction of rapid change is away from a position of the sensor and is opposite a direction of linear momentum of the sensor. For example, in an instance where the vehicle is at rest and the momentum of the sensor is zero, a rapid acceleration of the vehicle will result in a gravitational force being exerted on the sensor due to the rapid change in the momentum of the sensor. Where that rapid change is in the direction that is perpendicular to the face of the bi-directional spring 50, resulting vibrational forces acting on the sensor are minimized through flexure of the bi-directional spring device 50. Because the spring is bi-directional, forces resulting from rapid deceleration can be likewise accounted for. In one aspect, broadly speaking, when the bi-directional spring device 50 is used in connection with a linear spring, the technology can be used in a method of minimizing and isolating vibrational forces acting on a payload. The method comprises operating a vehicle having a bi-directional spring system disposed on the vehicle, the bi-directional spring system carrying a payload supported by the spring system. As noted herein, the bi-directional spring system comprises a non-linear bi-directional spring member coupled to a linear bi-directional spring member such that the spring rate of the non-linear spring is lower than the spring rate of the linear spring when displaced a first amount, the first amount being less than the total spring travel and higher than the spring rate of the linear spring when the combined spring is displaced a second amount, the second amount being greater than the first amount. A load is created on the bi-directional spring system by moving the vehicle or operating a device disposed about the vehicle and inducing a vibration force on the payload. In one aspect, the configuration of the linear and non-linear spring with a supported payload has a resonant frequency that is low for small displacements, providing high attenuation of transmitted vibrations, and high for large displacements, limiting displacement during high acceleration events, and reducing dynamic coupling with lower resonant frequency structural modes elsewhere in the system to which the payload is coupled, those components of the system having lower resonant frequency structures.

While specific reference has been made to forces resulting from acceleration and deceleration, in one aspect of the technology, the bi-directional spring device 50 is also used to attenuate vibrational forces (e.g., harmonic motion) resulting from general movement of the vehicle rather than non-harmonic motion or vibrational forces resulting from operation of a machine coupled to or carried by the vehicle. Moreover, while specific reference is made herein to a sensor, it is understood that other devices housed on the vehicle that one may wish to isolate from vibrational forces during movement of the vehicle are contemplated for use herein.

In addition to the flexure of the compliant member 51 in direction B as shown in FIG. 6, the compliant member 51 may flex in a quasi-"pitch" or "yaw" orientation. That is, flexure of the compliant member 51 in linear direction B through a center of mass 64 (i.e., in the y-axis) may occur. However, during a vibrational event, a sensor or other member supported by center constraint member 53 may induce a rotational moment force acting on the center constraint member 53 about the center of mass 64 through the x-axis (shown at "C") or z-axis (shown at "D"). The resulting rotational moment force is resisted in a bi-directional mode due to the flexure of the compliant member 51 in opposite directions on opposing sides of the center constraint member 53. For example, if a strut or other member is supported by center constraint member 53 and a force acting on a top, unsupported component of the strut causes the strut to tilt or move in a direction that is perpendicular to direction "B," a rotational force about the x-axis in the direction "C" would be mitigated by a downward flexure of the compliant member 51 on one side of the center constraint member 53 and an upward flexure of the compliant member 51 on the opposing side of the center constraint member 53. When used in connection with other aspects of the technology (e.g., the spring combination 110), the arrangement provides for pivoting of the center constraint member 53 (and any structures coupled thereto) with respect to the rigid annular member 52.

Figure 14:
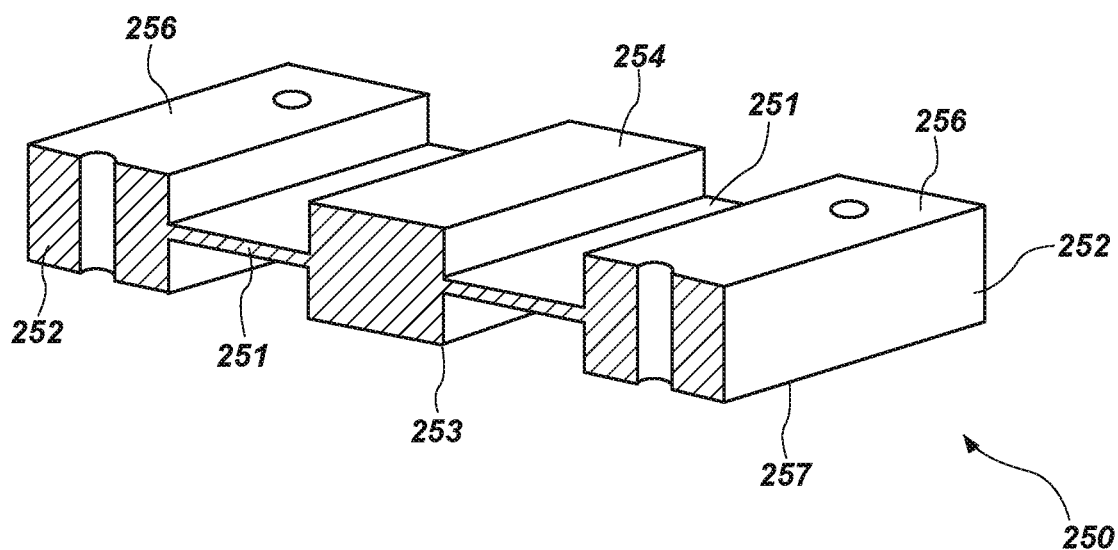
FIG. 14 is a perspective view of a bi-directional spring in accordance with one or more examples of the present disclosure.

Reference has been made to annular members for use in connection with the non-linear spring. It is understood that other geometries may be used without departing from the innovation of the present technology. For example, with reference generally to FIG. 14, a spring 250 is disclosed comprising a rigid outer member 252, a compliant member 251, and a center constraint member 253. Either the outer member 252 or the center constraint member 253 may be affixed to a vehicle or other device that is subject to vibrational forces. The arrangement takes advantage of the non-linear displacement and stiffness behavior of the compliant member 251 when loaded normal to the plane of the flexure of the compliant member 251. Top and bottom portions 254, 255, of the center constraint member 253 are coplanar with top and bottom portions 256, 257 of the rigid outer member 252 in one aspect of the technology, though such an arrangement is not required. As with the spring member 50, the spring member 250 can have a first position, wherein when the spring 250 is in an unbiased position. When subjected to a load, the center constraint member 253 can move in a direction perpendicular to a face of the rigid outer member 252 as the compliant member 251 flexes, placing the spring 250 in a second position, wherein the center constraint member 253 is displaced with respect to the rigid outer member 252. The spring 250 can have a third position where the center constraint member 253 moves to an opposite side of the rigid outer member 252 as a result of flexure of the compliant member 251 in a direction opposite the first direction. The resulting configuration provides for spring flexure in at least two directions having a variable (or non-linear) spring rate. While a single spring 250 is shown in FIG. 14, it is understood that a plurality of spring members stacked on top of one another coupled at the center constraint member 253 and rigid outer members 252 may also be used (see, e.g., the stacked annular arrangement shown in FIG. 5).

Figure 7:
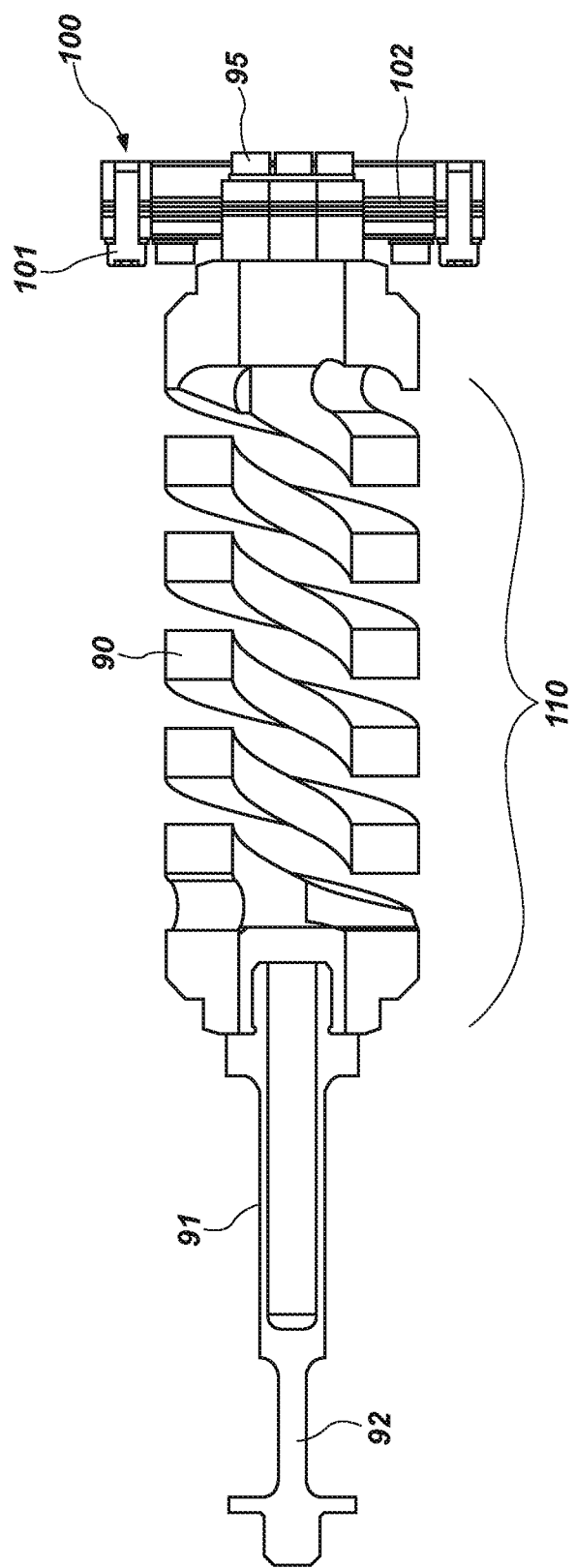
FIG. 7 is a cross-sectional view of a bi-directional spring coupled to a bi-directional non-linear spring in accordance with one or more examples of the present disclosure.
Figure 8:
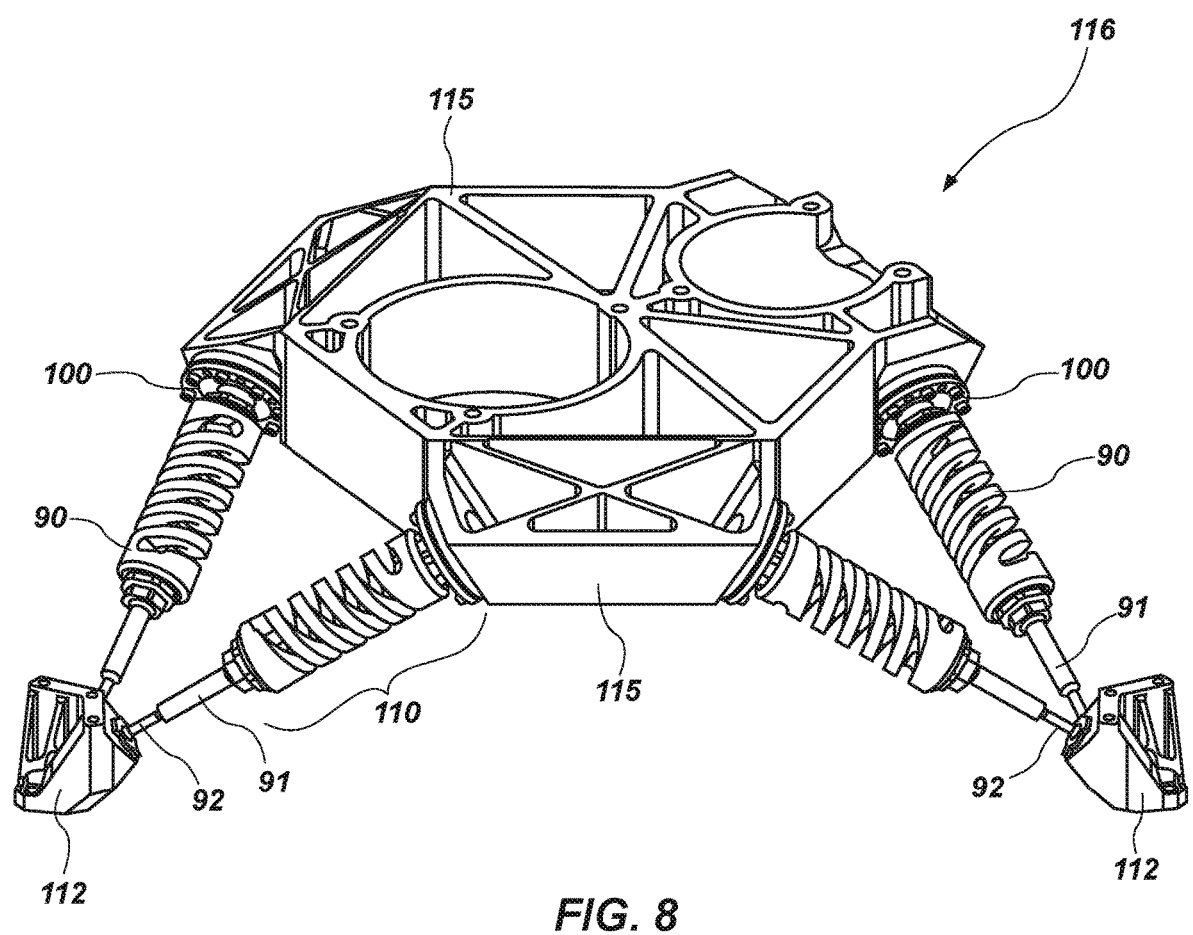
FIG. 8 is a support platform supported by an arrangement of bi-directional linear and non-linear springs in accordance with one or more examples of the present disclosure.
Figure 9:
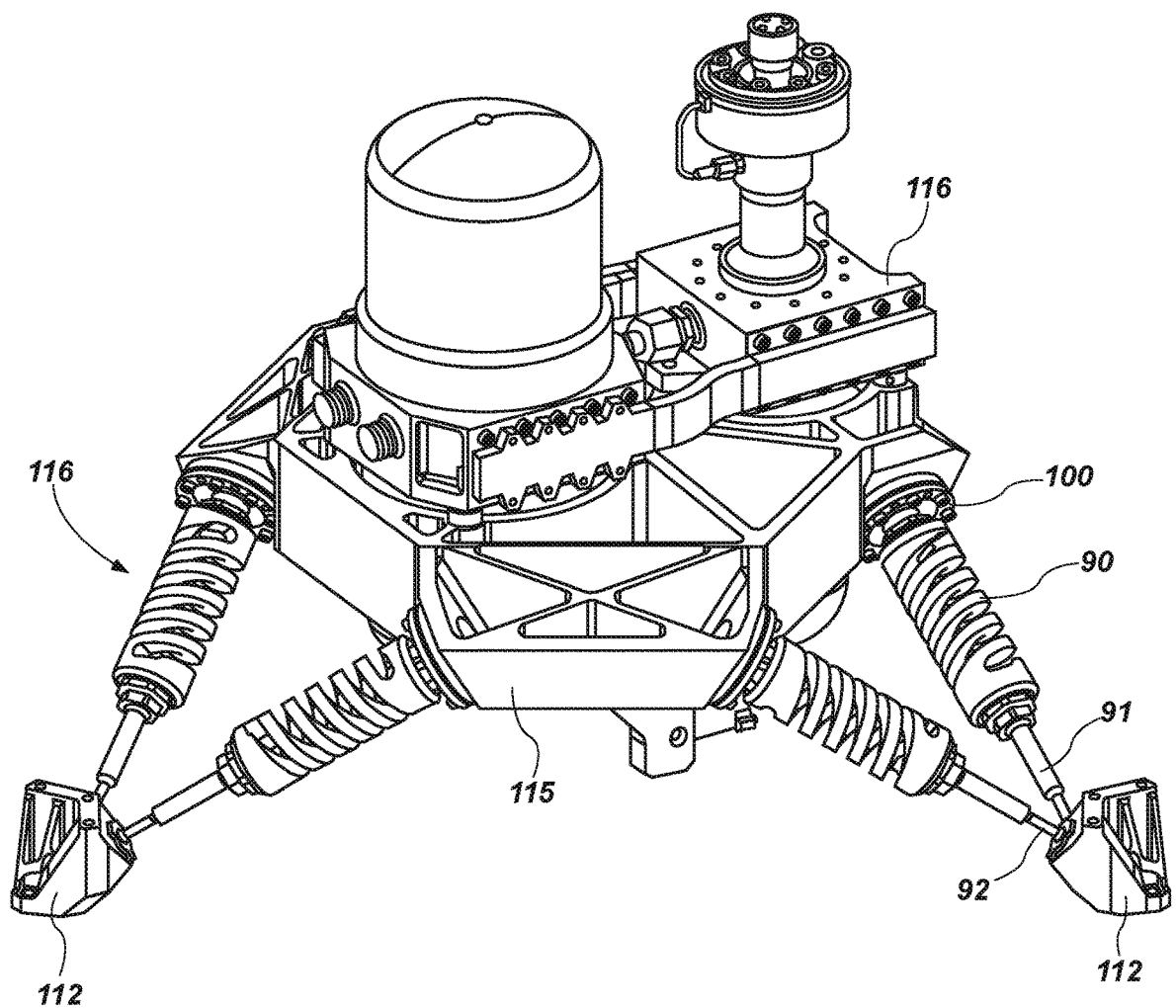
FIG. 9 is the support platform of FIG. 8 carrying a payload in accordance with one or more examples of the present disclosure.

With reference generally to FIGS. 1-5 and more specifically to FIGS. 7-9, it is understood that in one non-limiting example, the rigid annular member 52 can be fixed with relation to an accompanying vehicle (e.g., a rocket, airplane, automobile, etc.) and flexure of the bi-directional spring device 50 occurs through movement at the center portion 13 of the compliant member 51 relative to movement of the vehicle or forces acting on the bi-directional spring device 50 resulting from movement of the vehicle. It is understood, however, that the center portion 13 of the compliant member 51 or center constraint members 53 can be fixed to the vehicle, or other apparatus (see e.g., hexapod structure 116 and/or payload 117), and flexure of the bi-directional spring device 50 may occur as a result of movement of the rigid annular members 52 relative to movement of the vehicle or apparatus, forces created by movement of the vehicle, operation of devices housed on the vehicle, or other external forces. Also, while specific reference is made to a vehicle herein, it is understood that the bi-directional spring device 50 can be used in any number of applications where a bi-directional spring is desirable, including, but without limitation, in any instance where the attenuation of a vibrational force is desired.

In accordance with one aspect of the technology, a bi-directional dual-rate spring 110 is disclosed comprising a linear spring 90 co-axially coupled to a non-linear spring 100 at the center of the spring 90 by clamp 95. In one aspect, an outer diameter of the linear spring (e.g., a coil spring) 90 is substantially equivalent to an inner diameter of the outer constraint member 101 of the non-linear spring 100. The non-linear spring 100 is similar to the bi-directional spring device 50 referenced herein comprising at least a compliant planar member 102 constrained about its outer periphery in some manner thereby permitting flexure of the compliant member 102 to absorb a load (e.g., vibrations, etc.) placed thereon.

In one aspect, the linear spring 90 can be coupled to a fixed length or adjustable length rigid strut tube 91 and pivot/flexure leg 92. The adjustable length rigid strut tube 91 can comprise a plurality of nested rigid tubes that extend about a common axis and have a compression fitting or other device disposed about distal ends of the strut tube 91 to secure the extended (or non-extended) position of the adjustable length rigid strut tube 91 structure. In one aspect, the pivot/flexure leg 92 comprises a distal end post 93 configured to mate with an opening within a strut foot 112. The end post 93 is sized such that it can pivot within the opening of the strut foot 112 further minimizing vibrational forces acting on a load associated with the bi-directional dual-rate spring 110. Advantageously, the compliant members 102 of the non-linear spring 100 can be designed to absorb vibrational forces resulting from minor changes in vehicle movement (i.e., having a high degree of flexure from small movements) while the linear (e.g., coil) spring 90 can be designed to absorb vibration forces resulting from larger movement events (e.g., a missile launch, takeoff or landing of airplane, etc.). While specific reference is made to a linear coil spring 90, it is understood that other linear spring members may also be used herein. For example, a single helix, double-helix, wave spring, linear torsional spring, leaf spring, a machine slotted spring, or other spring may be used, and are contemplated for use herein.

In one non-limiting example, the non-linear/linear spring combination (or dual-rate spring) 110 can be used in connection with a vibration-isolated platform 115 supported by a plurality of non-linear spring combinations 110 forming a hexapod structure 117. A pair of non-linear/linear spring combinations 110 are coupled to the vibration-isolated platform 115 at separate locations on the platform 115 and then coupled together to a strut foot 112. Thus, a payload 116 disposed atop the isolated platform 115 is subjected to less vibration. The forces acting on the payload 116 can be created by movement of the vehicle or operation of devices associated with the vehicle and, in certain aspects, comprise a variety of different directional force vectors. In another non-limiting example, the payload 116 itself may comprise a separate vibrational source. For example, the payload 116 may comprise a cryogenic cooler, a liquid processor, air filtration system, momentum wheel, control moment gyroscope (CMG), or other device that generates vibration during use. In this instance, the vibration generated from the operation of the payload 116, which is less than the vibrational forces created during an acceleration event, is isolated from the remaining vehicle including, for example, a sensitive on-board sensor or other electronics. In another example the payload 116 is a sensor that requires isolation from vibrational forces generated by cryogenic coolers, liquid processors, etc.

Advantageously, the non-linear/linear spring combination (or spring strut) 110 optimizes attenuation of vibrational forces acting on the payload 116 during an acceleration event or high amplitude vibration associated with movement of the vehicle or operation of a device associated with the vehicle but provides the added benefit of "soft" or low amplitude vibrational attenuation when the vehicle is at rest but the payload 116 is creating "soft" or low amplitude vibrational forces resulting from its operation. In this manner, devices such as launch locks or bumpers (when used in a rocket application) can be eliminated from the vehicle. However, the vehicle need not be in two different operational states to take advantage of the multi-amplitude attenuation capabilities of the present technology. For example, during a single vehicle movement event, a payload 116 may experience both high amplitude and low amplitude vibrational forces at different stages of the vehicle movement. The present technology provides for an optimized transition at a nominal stage of vehicle (or associated device) operation between use of the linear spring aspect of the technology and the non-linear spring aspect of the technology, depending on the resonant frequency of vibrational forces. In one aspect, a resonant frequency of the bi-directional spring system for a first amount of total spring displacement is below a resonant frequency of the bi-directional spring system for a second displacement amount.

Put another way, the combined linear/non-linear spring is configured such that a spring rate of the non-linear spring is lower than the spring rate of the linear spring when displaced a first amount, the first amount being less than the total spring travel and higher than the spring rate of the linear spring when the combined spring is displaced a second amount, the second amount being greater than the first amount. In one aspect of the technology, the percent of total spring stroke or displacement (i.e., the total distance the combined spring travels or is displaced in compression or tension) at which the nonlinear and linear spring rates are equal is about ten percent but other percentages of stroke volume where the rates are equal may be used as suits a particular application. That effect is that, as opposed to a shock to a payload that is experienced with prior art attenuation devices, the present technology provides for a smooth transition between a low initial spring rate and higher high-displacement spring rate.

In one aspect, the effective spring rate of the non-linear/linear spring combination 110 can be expressed as the following function:

$$k=1/(1/k_L+1/k_V)$$

Where k equals the effective spring rate of the non-linear/linear spring combination (or spring strut) 110, $k_L$ equals the constant rate of the linear spring 90, and $k_V$ equals the variable spring rate of non-linear spring 100. In other words, the nonlinear spring has a spring rate that increases symmetrically (i.e., equally whether it is in tension or compression) with displacement. That is, when the nonlinear spring is in a nominal position it has a first spring rate and upon displacement a predetermined amount (all depending on the spring design), the non-linear spring will have a second, higher, spring rate. That increase in spring rate is bi-directional and increases equally when the spring is in compression or in tension. In one aspect, the linear spring rate has a constant spring rate between minimum and maximum rates of the non-linear spring and, in one aspect, is constant whether the linear spring is in tension or compression.

While specific reference is made herein with respect to a hexapod structure 116 supported in six degrees of freedom by a plurality of spring struts 110, it is understood that aspects of the technology may be used in connection with any number of different structures, including, but without limitation, a tripod, quadrapod, or other multi-post support structure supporting a payload in any number of a plurality of degrees of freedom. In other aspects, a single non-linear/linear spring combination (or spring strut) 110 may be used as suits a particular application. Moreover, it is understood that because aspects of the technology may be used in a zero-gravity environment, the spring strut 110 may be placed on opposing sides of a payload 116 or vibration-isolated platform 115, including top and bottom and/or opposing lateral sides. It is not necessary that these arrangements only be used in zero-gravity, however. Such use is only provided as an exemplary use of said arrangement.

While specific reference is made herein to an assembly of different layers and components that are separately machined and assembled to form a bi-directional spring having a variable spring rate, it is understood that in accordance with one aspect of the invention, a bi-directional spring device can be integrally formed and machined from a single material, That is, the individual components can be separately manufactured and later assembled as described more fully above, or machined, molded, or otherwise created as a single integrated unit out of a single piece of material. Generally speaking, in one aspect of the technology, a spring with a variable (or non-linear) spring rate is machined or formed in a manner that achieves similar non-linear (i.e., increased rate with increased displacement) spring rate in at least two directions. The form of the spring comprises a series of collinear planar annular regions connected by thicker (and hence more rigid) regions alternatively at the inner diameter and outer diameter of the planar annular regions having a uniform thickness. A cylindrical lumen is formed through the center of adjacent planar annular regions. This arrangement allows the thinner planar annular regions to flex while the thick regions remain rigid ensuring the same spring rate in both tension and compression. The plurality of planar annular regions coupled at alternating interior and exterior points by a plurality of rigid constraints results in a first spring rate when the spring is displaced greater than a first predetermined difference and a second spring rate (which is greater than the first spring rate) when displaced greater than a second predetermined distances. The first spring rate is the same whether the spring is in compression or tension. Likewise, the second spring rate is the same whether the spring is in compression or tension.

Figure 12:
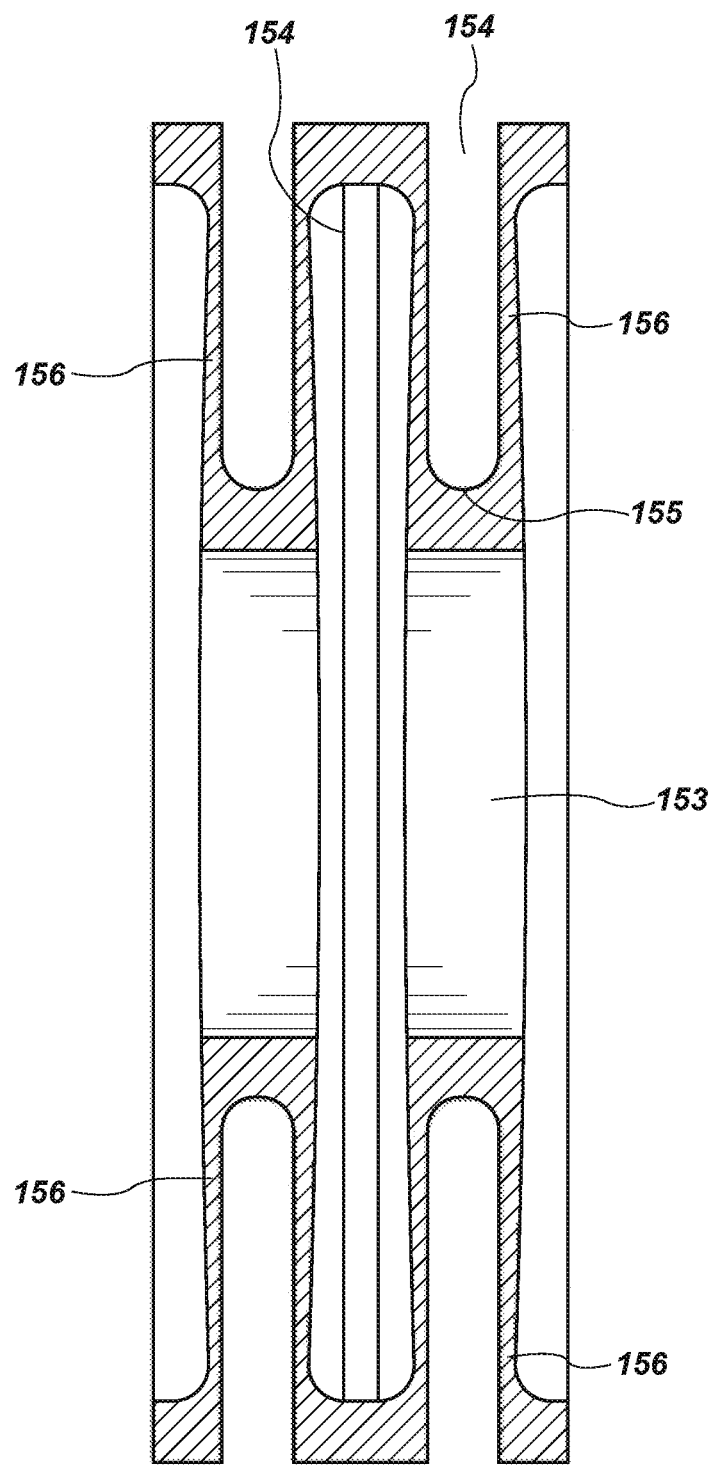
FIG. 12 is a cross-sectional side-view of a bi-directional spring in accordance with one or more examples of the present disclosure.
Figure 13:
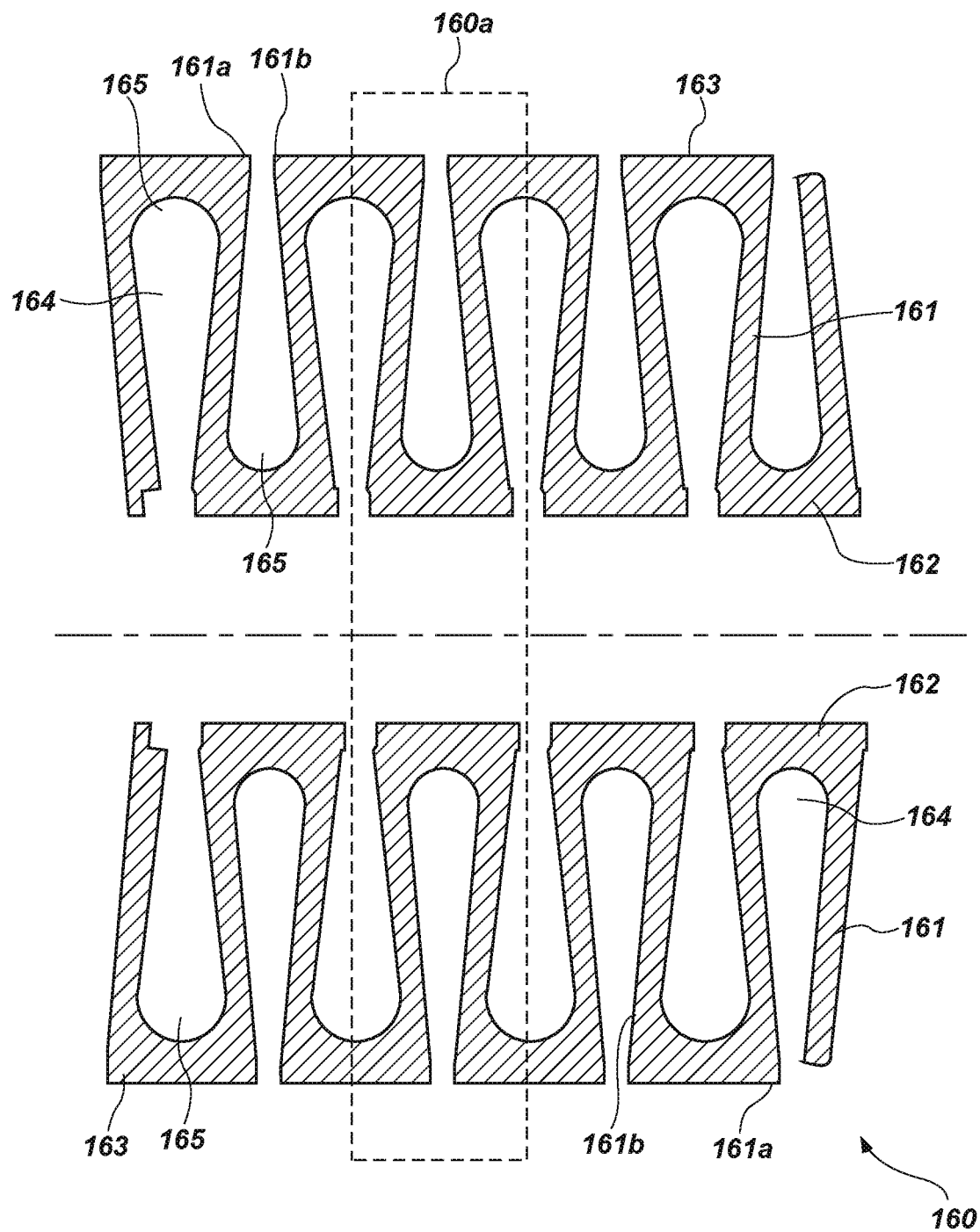
FIG. 13 is a cross-section side-view of a bi-directional spring in accordance with one or more examples of the present disclosure.

In accordance with one aspect of the technology, with reference generally to FIGS. 12-13, a bi-directional spring device 150 is shown that comprises an integrated unit that is generally cylindrical in nature having a plurality of rigid center constraints 153. Compliant diaphragm members 151 (i.e., the annular planar members or planar annular regions) are integrally formed with the rigid center constraints 153 at an inner diameter of the compliant diaphragm members 151 and terminate at an outer edge 152 at the outer diameter of the compliant diaphragm members 151. The rigid center constraints 153 and outer edge 152 are thicker than the compliant diaphragm members 151. As such, when a force is applied to the rigid center constraints 153, the thinner annular planar regions 151 flex. The bi-directional spring device 150 can comprise alternating cylindrical spaces 154 between the walls of the compliant diaphragm members 151 that permit and also limit flexing of the compliant diaphragm members 151 to absorb a load placed on the rigid center constraint 153. The alternating spaces formed between adjacent annular planar members comprise a closed end and an open end, wherein the closed end is defined by the inner center constraints and the open end is defined by the opposing outer edges. Additionally, the spaces comprise a closed end and an open end, wherein the closed end is defined by the outer edge and the open end is defined by opposing center constraints. The spaces can be configured to be conical (See FIG. 13) to facilitate bi-directional symmetric spring rates.

In one aspect of the technology, the outer edge 152 is relatively stationary with respect to the remainder of the spring device 150. That is, the outer edge 152 moves significantly less in relation to the movement of the rigid center constraints 153. In one aspect, ends A and B of spring device 150 are fixed to a portion of a vehicle, payload, or other device capable of creating a vibrational force. As vibrational forces are transmitted to the spring member 150 at ends A and/or B, the rigid center constraints 153 are compressed or extended based on flexure of compliant diaphragm members 151 resulting in attenuation of vibrational forces. In one aspect of the technology, a single spring section 160a may be machined and then welded (or otherwise secured) to a plurality of other machined spring sections in series to create a larger spring. Alternatively, a plurality of spring sections may be machined from a single piece of material.

Figure 10:
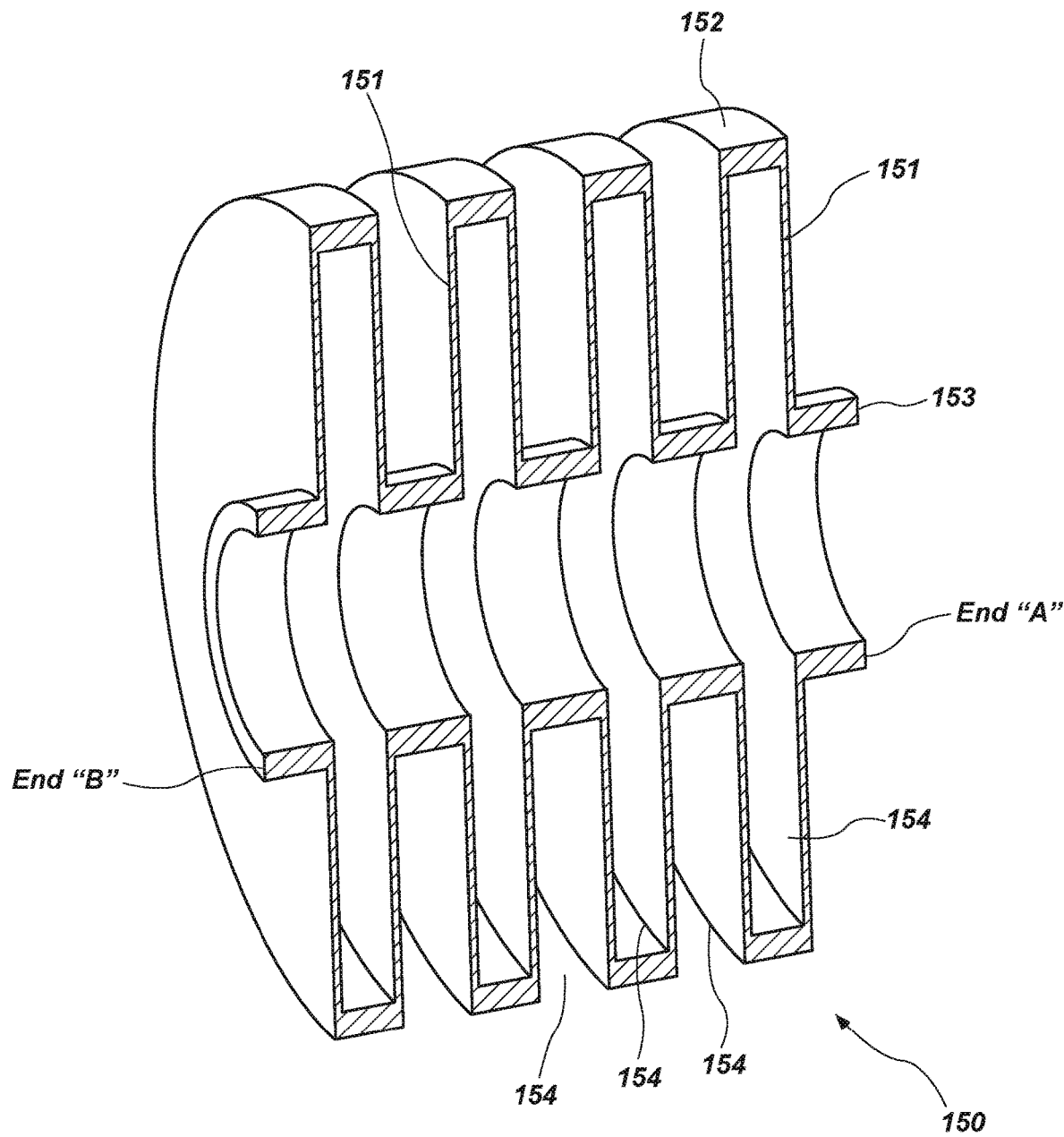
FIG. 10 is a cross-sectional perspective view of a bi-directional spring in accordance with one or more examples of the present disclosure.
Figure 11:
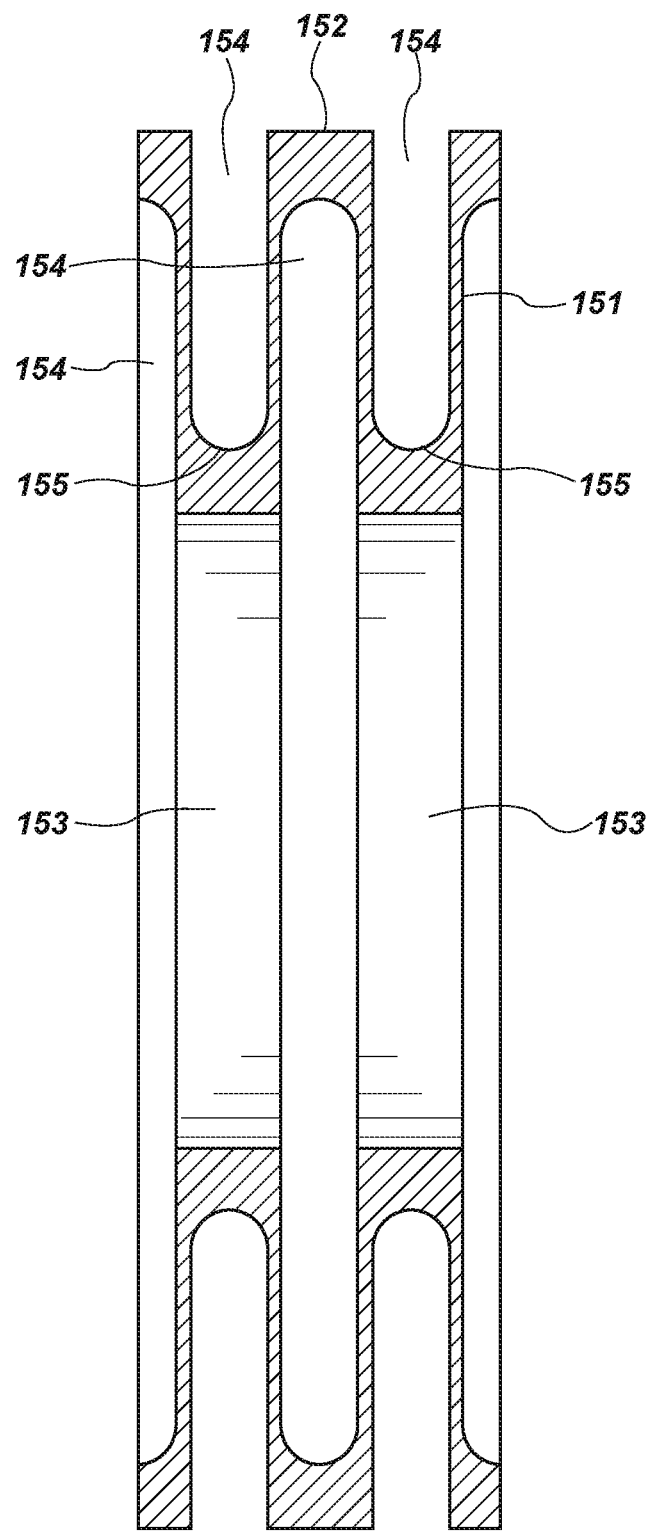
FIG. 11 is a cross-sectional side-view of a bi-directional spring in accordance with one or more examples of the present disclosure.

In one aspect of the technology, as shown more fully in FIG. 11, the diaphragm members 151 have a uniform thickness and terminate at the rigid center constraint 153. As shown in FIGS. 11-13, a fillet or curvilinear arrangement 155 may be disposed about the internal corners of unitary spring 150. Rather than angular corners like those shown in FIG. 10, the fillet 155 reduces peak stresses on the corners of the unitary spring 150 during operation. In another aspect of the technology, however, as shown more fully in FIGS. 12 and 13 at 156, the diaphragm 151 thickness may vary as the diaphragm extends laterally from the rigid center constraint 153 (i.e., the inner diameter of the annular planar region or compliant diaphragm member 151) to the outer edge 152 (i.e., the outer diameter of the annular planar region or diaphragm 151). In one aspect, the thickness of the annular planar region decreases as the compliant diaphragm member 151 extends laterally outward from the rigid center constraint 153 (or inner diameter) to the outer edge 152 (or outer diameter) to reduce peak stresses on the spring 150 nearer the outer diameter of the annular planar region. Alternatively, in another aspect, the compliant diaphragm member 151 thickness increases as it extends laterally from the rigid center constraint 153 to the outer edge 152 as suits a particular application where a reduction of peak stresses near the rigid center constraint 153 is desirable. Depending on where the load is placed on the spring 150, the relative variable thinning of the compliant diaphragm member 151 results in a reduction of peak stresses on the spring 150. In one aspect, the thickness of the compliant diaphragm member 151 increases in a direction away from a longitudinal axis of the spring at a linear or non-linear rate. In another aspect, the thickness of the compliant diaphragm member 151 decreases in a direction away from a longitudinal axis of the spring at a linear or non-linear rate.

In one aspect of the technology, the unitary spring 150 is combined with a linear spring such as that shown in FIG. 7. In other words, the unitary spring 150 may be substituted for the non-linear spring 100 in the linear/non-linear spring combination (or spring strut) 110 shown in FIG. 7 and used in a manner similar to that shown and described above. While the unitary spring 150 may be machined, it can also be injection molded, compression molded, blow molded, vacuum formed, or extrusion molded. Components of the non-linear spring 100 may likewise be manufactured. In one aspect the unitary spring 150 and the non-linear spring 100 are manufactured from the same type of material. However, in an alternative arrangement, the two springs are manufactured from a different type of material.

With reference now to FIG. 13, a unitary spring 160 is shown having a plurality of annular planar regions 161 coupled at alternative inner diameters 162 (i.e., center constraint) and outer diameters 163 (i.e., outer edge). The inner diameters 162 and outer diameters 163 have a wall thickness that is greater than the wall thickness of the annular planar regions 161. Internal corners 165 comprise a fillet or rounded edge. In this aspect of the technology, the thickness of the walls of the annular planar regions 161 are substantially uniform. However, the relative angle of the walls creates a space 164 between annular walls that defines a cone-like shape. In other words, the distance between opposing walls 161a, 161b in one spring segment 160a, is greater near the inner diameters 162 than the distance between opposing walls near the outer diameters 163. Alternatively, depending on how any particular spring segment is constructed, the opposite arrangement may exist. That is, the distance between opposing walls 161a, 161b in the spring segment, is smaller near the inner diameters 162 than the distance between opposing walls near the outer diameters 163. The end result is an alternating pattern of cone-shaped spring elements. Advantageously, the cone-shaped spring elements result in a net spring rate that is symmetric in both compression and tension. In one aspect, the cone formed by the shape of the walls 161a, 161b has a first angle when in an unbiased state resulting in a specific net spring rate. However, in another aspect, the cone may have a different angle when in an unbiased state resulting in a different specific net spring rate due to the different angle of the cone. Regardless, the angle of the cone increases when the spring is displaced in tension and decreases when the spring is displaced in compression.

Put another way, the bi-directional linear spring shown in FIGS. 10-13 can be described as one or more convolutions revolved about a longitudinal axis. Each convolution has an annular region 151 with a first thickness connected in series by cylindrical regions 152 having a continuous second thickness. In one aspect, the thickness of the annular regions 151 is less than the thickness of the cylindrical regions 152. Outer portions of adjacent annular regions are coupled together by a first cylindrical region and inner portions of adjacent annular regions are coupled together by a second cylindrical region such that the effective spring rate of the bi-directional spring increases symmetrically. That is, it increases at the same rate in compression as it does in tension.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A bi-directional nonlinear spring, comprising:
a plurality of convolutions revolved about a longitudinal axis each having an annular region with a first thickness integrally formed in series with cylindrical regions having a second thickness, wherein the first thickness is less than the second thickness,
wherein outer portions of adjacent annular regions are integrally formed with a first cylindrical region and inner portions of adjacent annular regions are integrally formed with a second cylindrical region such that the effective spring rate of the bi-directional spring device increases symmetrically as it is displaced in either compression or tension.

2. The bi-directional nonlinear spring of claim 1, wherein adjacent annular regions are parallel.

3. The bi-directional nonlinear spring of claim 1, wherein adjacent annular regions form a cone having a cone angle.

4. The bi-directional nonlinear spring of claim 3, wherein the cone angle formed by adjacent annular regions is increased when the spring is displaced in tension.

5. The bi-directional spring of claim 1, wherein the cylindrical regions have a uniform thickness.

6. The bi-directional spring of claim 1, wherein the thickness of the annular region varies in a direction away from a longitudinal axis of the spring.

7. The bi-directional spring of claim 6, wherein the thickness of the annular region varies at a linear rate.

8. The bi-directional spring of claim 1, wherein the thickness of the annular region decreases in a direction away from a longitudinal axis of the spring.

9. The bi-directional spring of claim 8, wherein the thickness of the annular region decreases at a linear rate or a nonlinear rate.

10. The bi-directional spring of claim 1, wherein the spring comprises a unitary spring machined from a single piece of material or a plurality of revolved convolutions coupled together to form a series of revolved convolutions.

\* \* \* \* \*